United States Patent
Yamamura

(10) Patent No.: US 10,409,062 B2
(45) Date of Patent: Sep. 10, 2019

(54) VEHICLE DISPLAY DEVICE

(71) Applicant: NIPPON SEIKI CO., LTD., Niigata (JP)

(72) Inventor: Ayako Yamamura, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/552,100

(22) PCT Filed: Feb. 18, 2016

(86) PCT No.: PCT/JP2016/054663
§ 371 (c)(1),
(2) Date: Aug. 18, 2017

(87) PCT Pub. No.: WO2016/136573
PCT Pub. Date: Sep. 1, 2016

(65) Prior Publication Data
US 2018/0031834 A1    Feb. 1, 2018

(30) Foreign Application Priority Data

Feb. 24, 2015    (JP) .................... 2015-034256

(51) Int. Cl.
*G02B 27/01*    (2006.01)
*B60K 35/00*    (2006.01)
*G06K 9/00*    (2006.01)

(52) U.S. Cl.
CPC .......... *G02B 27/0149* (2013.01); *B60K 35/00* (2013.01); *G02B 27/01* (2013.01);
(Continued)

(58) Field of Classification Search
CPC ............... G02B 27/01; G02B 27/0101; G02B 27/0149; G02B 27/0154; G02B 2027/011;
(Continued)

(56) References Cited

U.S. PATENT DOCUMENTS 7,519,471 B2    4/2009   Shibata et al.
9,047,703 B2    6/2015   Beckwith et al.
(Continued)

FOREIGN PATENT DOCUMENTS

EP    1 674 323 A1    6/2006
JP    H06-247184 A    9/1994
(Continued)

OTHER PUBLICATIONS

International Search Report issued in Application No. PCT/JP2016/054663 dated Apr. 26, 2016, with English translation.
(Continued)

*Primary Examiner* — Priyank J Shah
(74) *Attorney, Agent, or Firm* — McDermott Will & Emery LLP

(57) ABSTRACT

Provided is a vehicle display device capable of providing a user with appropriate information, without being affected by changes in the position of the viewpoint of the user. This vehicle display device is provided with: an image display unit having a display screen capable of displaying images on at least part thereof; an image generating unit which generates images to be displayed by the image display unit; a viewpoint position acquiring unit which acquires a viewpoint position of a user seated on a driver's seat of a vehicle; and a projecting unit which projects the images toward a transparent front windshield of the vehicle in such a way that the images are reflected in the transparent front windshield of the vehicle, thereby allowing the user seated in the driver's seat to visually recognize a virtual image. The image generating unit determines a usage region to be used to display the images, within the display screen of the image display unit, in accordance with the viewpoint position of the user that has been acquired by the viewpoint position acquiring unit.

8 Claims, 12 Drawing Sheets

(52) U.S. Cl.
CPC ..... *G02B 27/0101* (2013.01); *G06K 9/00838* (2013.01); *B60K 2370/155* (2019.05); *B60K 2370/16* (2019.05); *B60K 2370/31* (2019.05); *B60K 2370/334* (2019.05); *B60K 2370/347* (2019.05); *G02B 2027/014* (2013.01); *G02B 2027/0138* (2013.01); *G02B 2027/0154* (2013.01)

(58) Field of Classification Search
CPC .... G02B 2027/0138; G02B 2027/0159; G02B 2027/0181; G02B 2027/0185
See application file for complete search history.

(56) References Cited

U.S. PATENT DOCUMENTS

| | | | |
|---|---|---|---|
| 9,251,715 | B2 | 2/2016 | Hing et al. |
| 9,405,120 | B2 | 8/2016 | Graf et al. |
| 9,939,638 | B2* | 4/2018 | Yagi ................... G02B 27/0101 |
| 2002/0067366 | A1* | 6/2002 | Hirao ...................... B60K 35/00 345/660 |
| 2006/0262140 | A1 | 11/2006 | Kujawa et al. |
| 2007/0115205 | A1* | 5/2007 | Uchiyama .......... G02B 26/0816 345/7 |
| 2008/0212196 | A1* | 9/2008 | Watanabe ............. G02B 27/01 359/632 |
| 2009/0128317 | A1* | 5/2009 | Hideshiro ............. B60K 35/00 340/459 |
| 2011/0227717 | A1 | 9/2011 | Kumon |
| 2012/0050138 | A1 | 3/2012 | Sato et al. |
| 2012/0154441 | A1 | 6/2012 | Kim |
| 2012/0224062 | A1 | 9/2012 | Lacoste et al. |
| 2012/0268351 | A1 | 10/2012 | Sasaki et al. |
| 2013/0201335 | A1 | 8/2013 | Heinemann |
| 2014/0063064 | A1 | 3/2014 | Seo et al. |
| 2014/0152711 | A1* | 6/2014 | Sekiya .................. G02B 27/01 345/690 |
| 2014/0267398 | A1 | 9/2014 | Beckwith et al. |
| 2018/0210210 | A1* | 7/2018 | Yamamura ........... H04N 13/366 |

FOREIGN PATENT DOCUMENTS

| | | | | | |
|---|---|---|---|---|---|
| JP | 07-144557 | A | | 6/1995 | |
| JP | 11-314538 | A | | 11/1999 | |
| JP | 2001-018682 | A | | 1/2001 | |
| JP | 2005-247224 | A | | 9/2005 | |
| JP | 2008-296701 | A | | 12/2008 | |
| JP | 2008296701 | A | * | 12/2008 | ............ B60K 35/00 |
| JP | 2010-256878 | A | | 11/2010 | |
| JP | 2011-073496 | A | | 4/2011 | |
| JP | 2012-006469 | A | | 1/2012 | |
| JP | 2012-035745 | A | | 2/2012 | |
| JP | 2012-153256 | A | | 8/2012 | |
| JP | WO 2013005525 | A1 | * | 10/2013 | ............ G02B 27/01 |
| JP | 2014-210537 | A | | 11/2014 | |
| WO | 2013/179494 | A1 | | 12/2013 | |
| WO | 2014/061138 | A1 | | 4/2014 | |

OTHER PUBLICATIONS

Extended Search Report issued in corresponding European Patent Application No. 16755320.5, dated Sep. 10, 2018.
International Search Report issued in related corresponding International Patent Application No. PCT/JP2016/071798, dated Aug. 30, 2016, with English Translation.
U.S. Non-Final Office Action issued in related U.S. Appl. No. 15/744,745, dated Jul. 12, 2018.
U.S. Notice of Allowance issued in related U.S. Appl. No. 15/744,745, dated Oct. 31, 2018.

* cited by examiner

[Fig.1B]
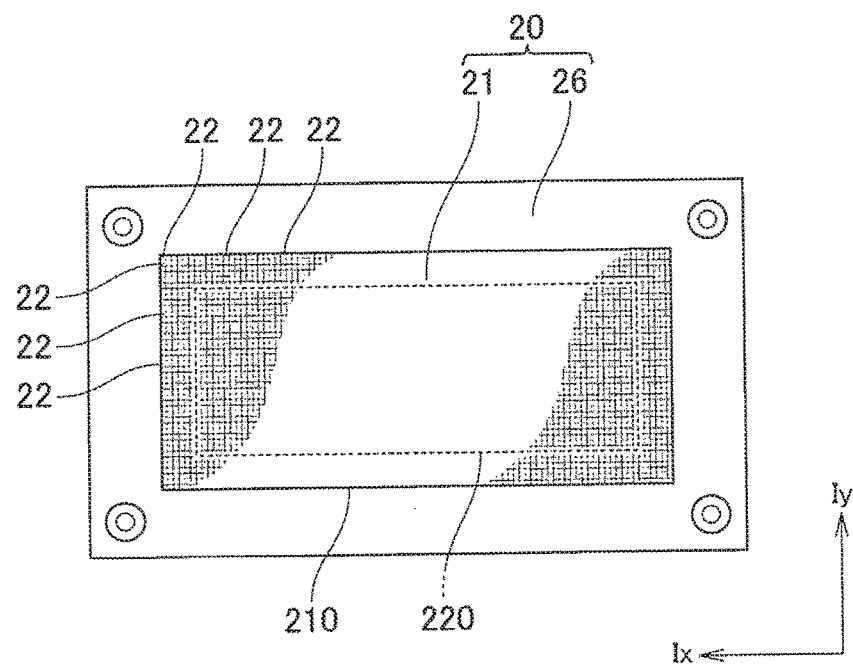

[Fig.3]
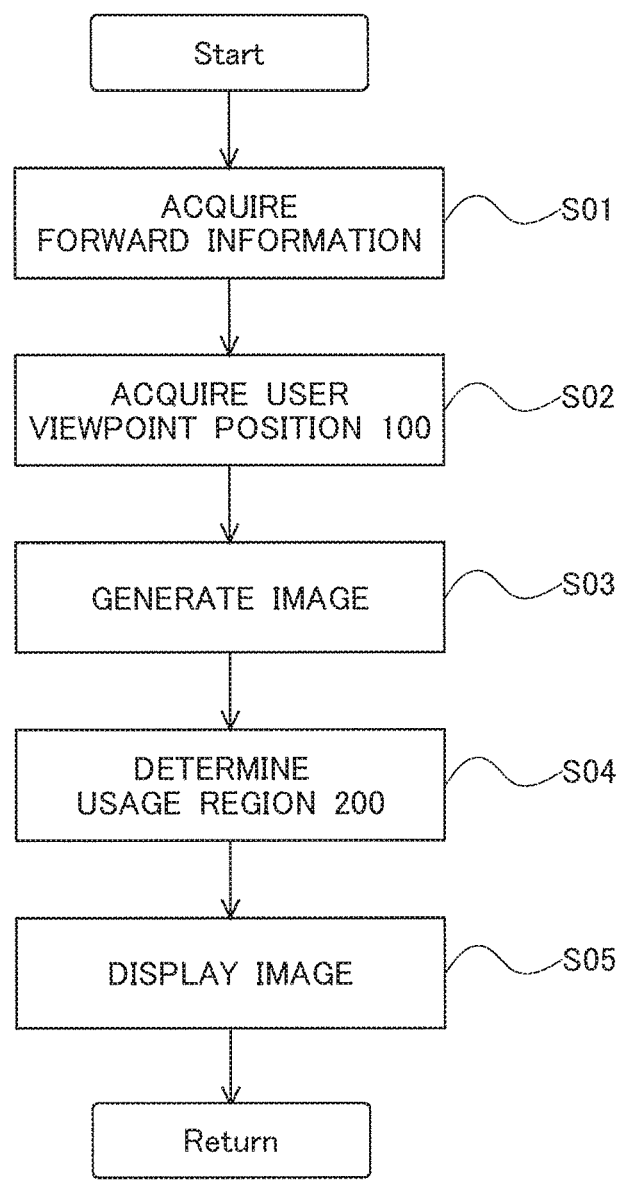

[Fig.4A]
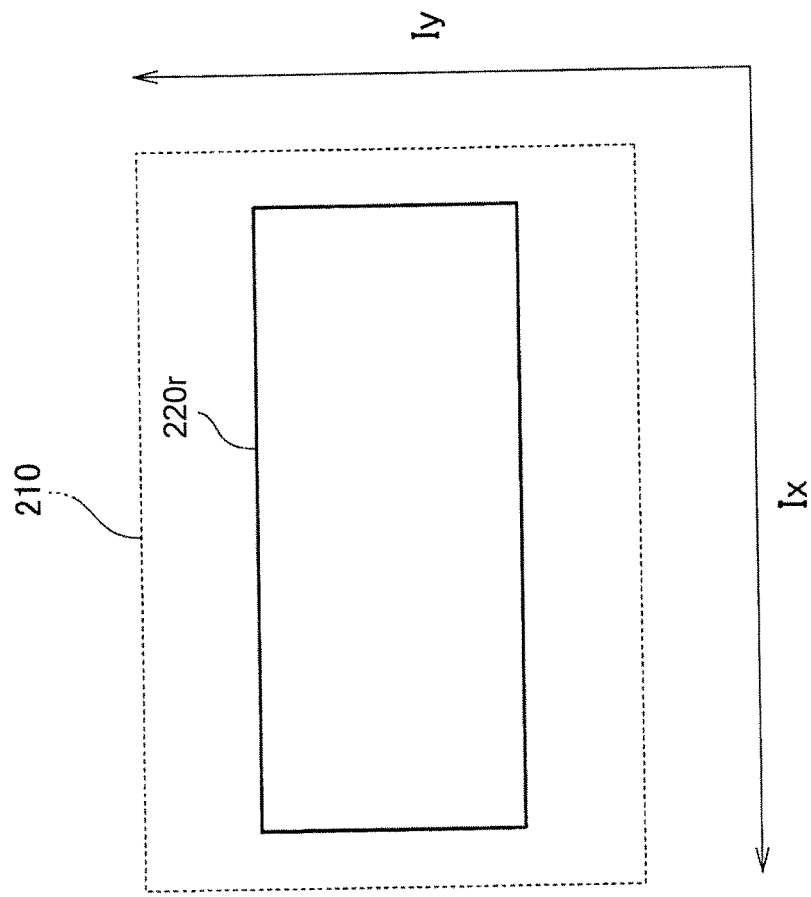
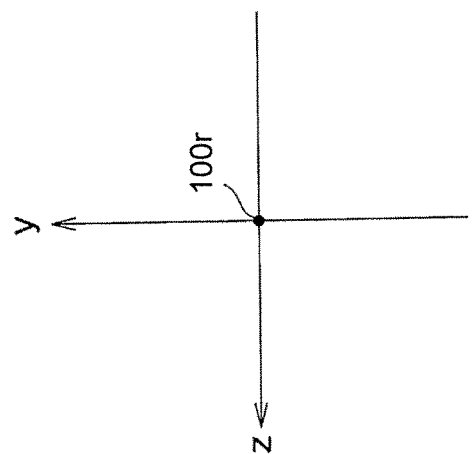

[Fig.4B]
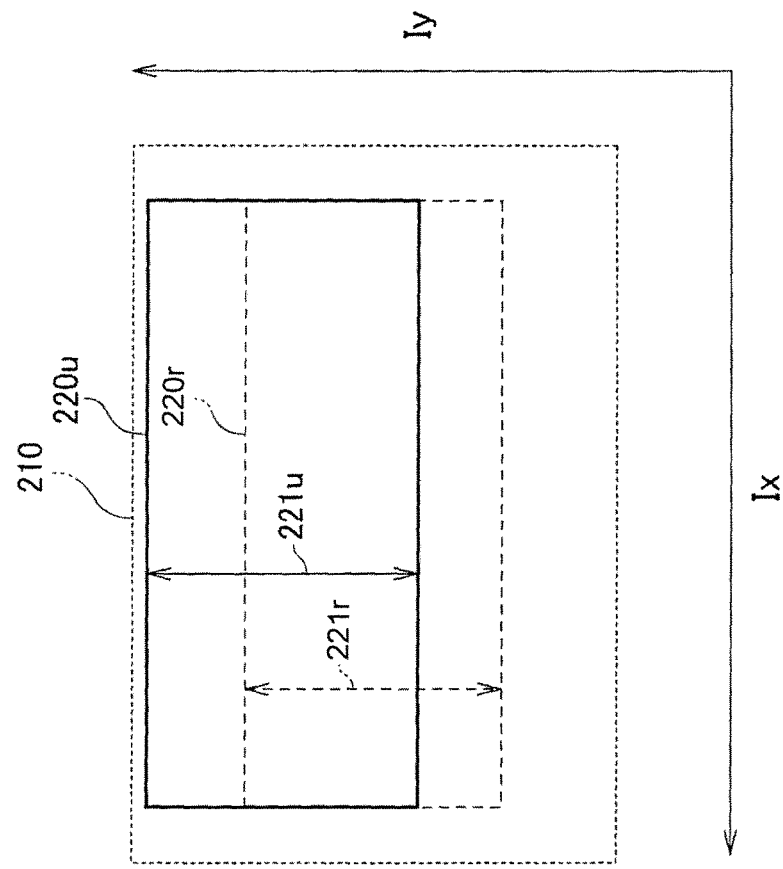
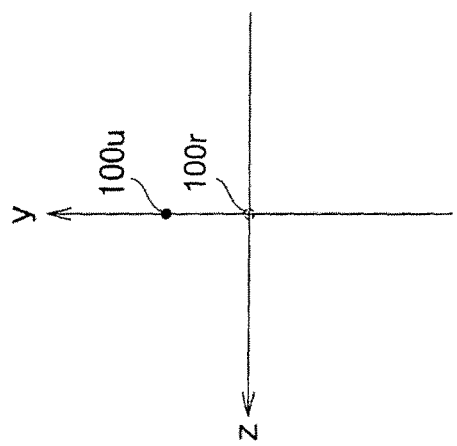

[Fig.4C]
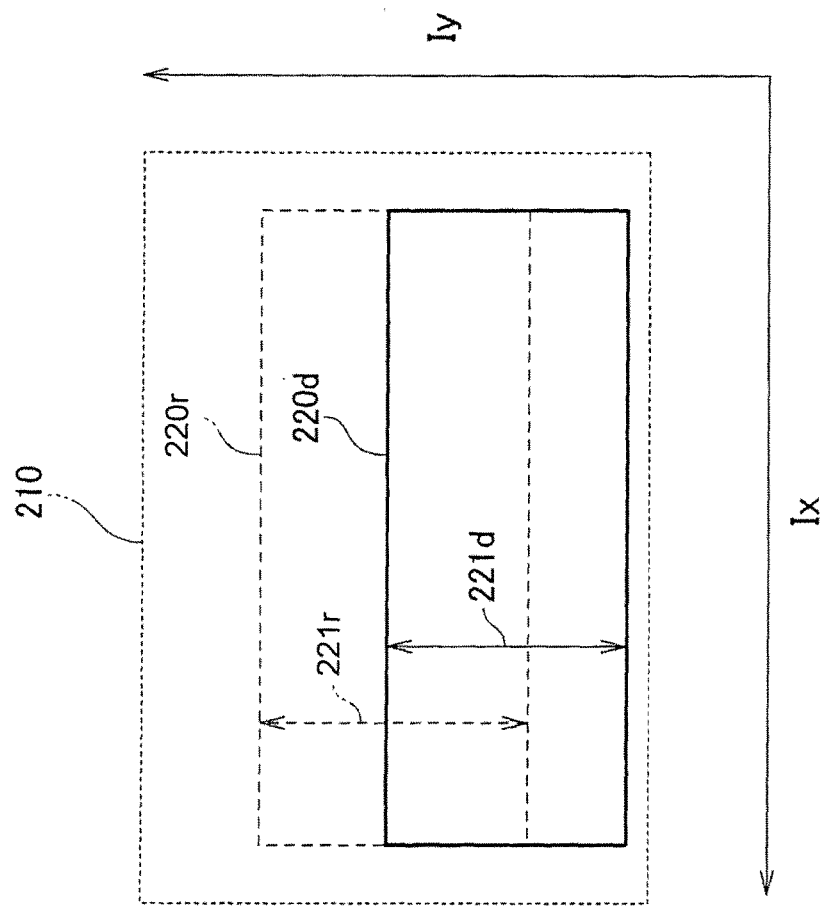
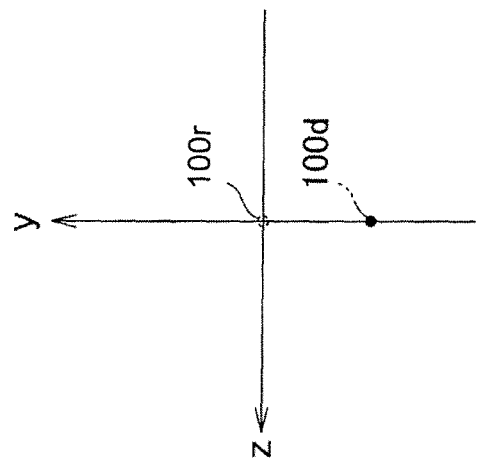

[Fig.4D]
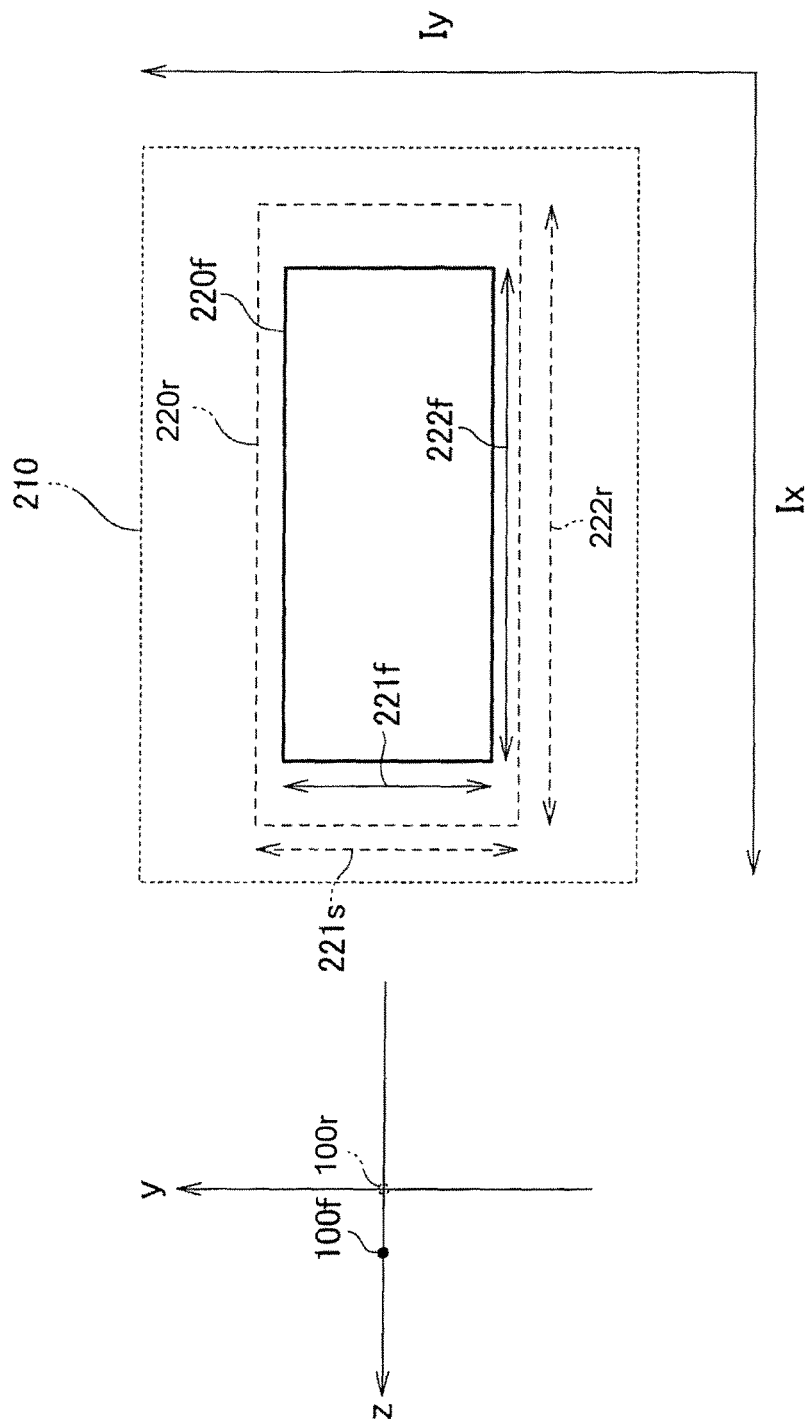

[Fig.4E]
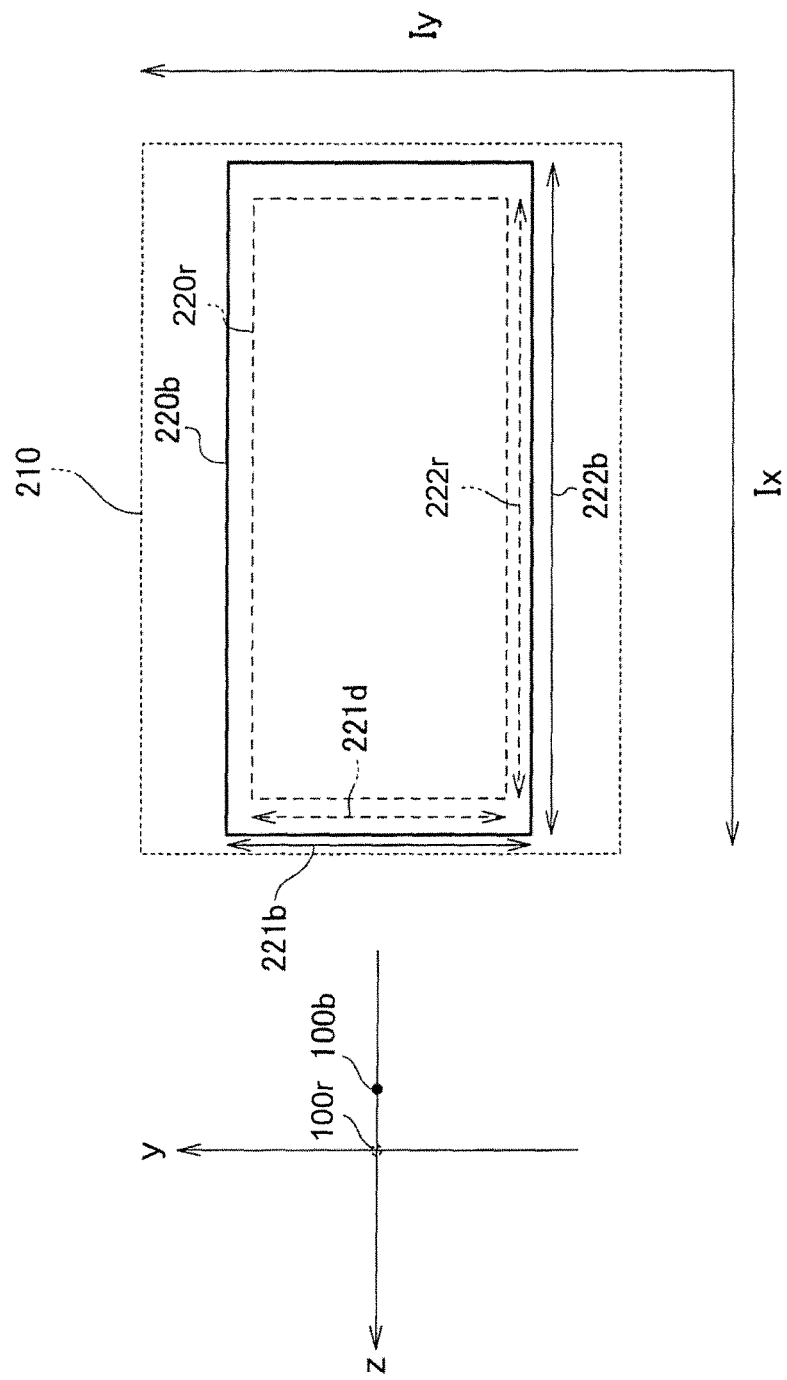

[Fig.5]
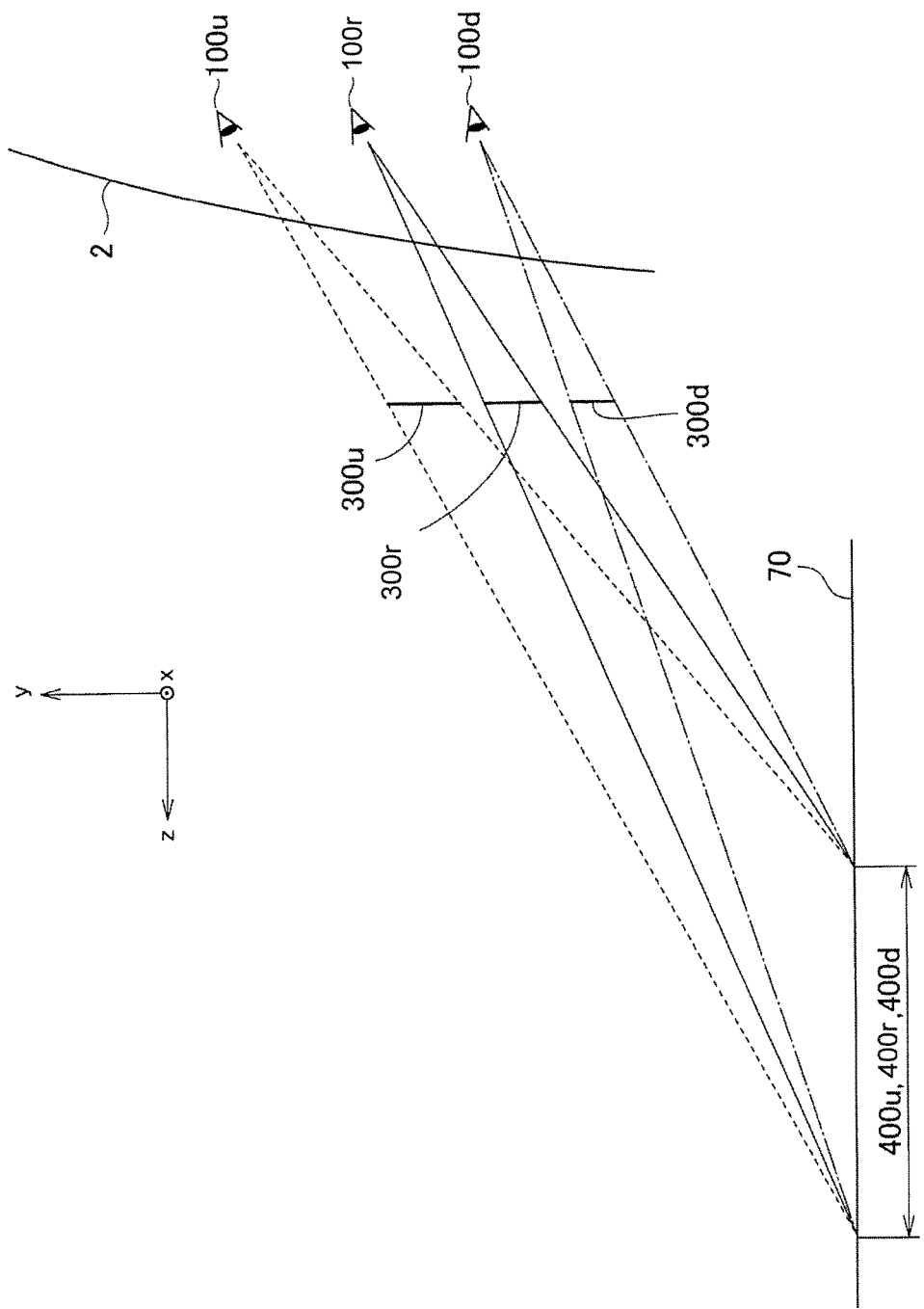

[Fig.6]
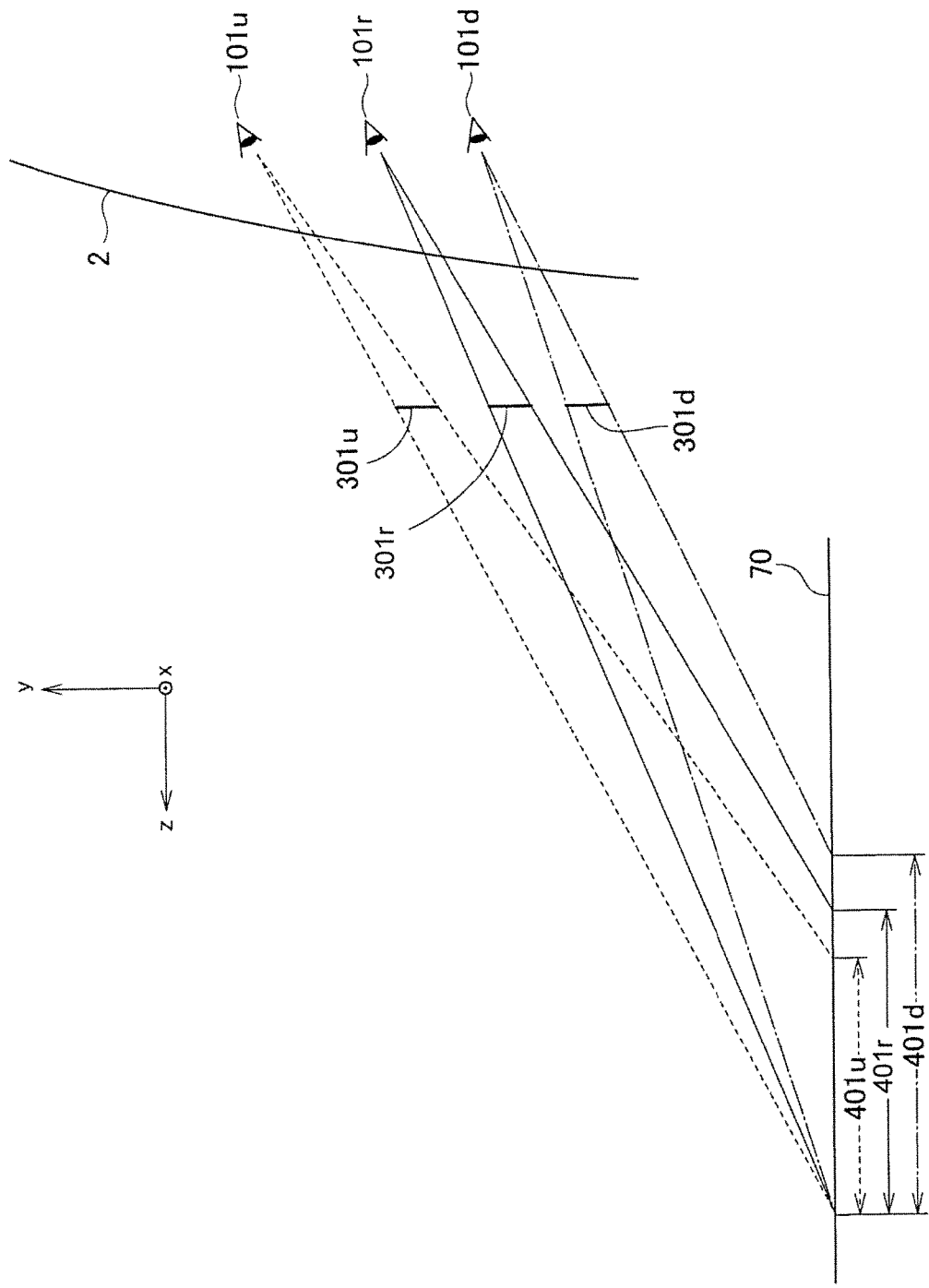

VEHICLE DISPLAY DEVICE

RELATED APPLICATIONS

This application is the U.S. National Phase under 35 U.S.C. § 371 of International Application No. PCT/W2016/054663, filed on Feb. 18, 2016, which in turn claims the benefit of Japanese Application. No. 2015-034256, filed on Feb. 24, 2015, the disclosures of which are incorporated by reference herein.

Technical Field

The present invention relates to a vehicle display device. The invention particularly relates to a vehicle display device capable of providing appropriate information to a user without being influenced by a change in a position of a viewpoint of the user.

Background Art

As a vehicle display device, there is a so-called head-up display for projecting a display image onto a light transmitting member such as a front windshield of a vehicle to cause a user who sits on a driver' s seat to visually recognize a virtual image with the use of light of the display image reflected on the front windshield. In the vehicle display device, the virtual image is visually recognized by the user who sits on the driver's seat so that the virtual image is formed on a forward side of the vehicle via the front windshield in a direction of travel of the vehicle (in front of the vehicle). The vehicle display device includes, as a general configuration, for example, an image display unit for displaying a display image and a projecting unit configured by an optical system including a concave mirror for projecting the display image onto the front windshield of the vehicle.

The user who sits on the driver's seat of the vehicle in which the vehicle display device is provided can visually recognize, for example, a virtual image that provides information indicating that another vehicle, an obstacle, or the like exists on a road in front of the vehicle in a state in which the virtual image is superimposed on scenery seen through the front windshield. As a position at which the virtual image is visually recognized moves upward in a vertical direction of the front windshield, the virtual image is visually recognized while being superimposed on a scene positioning on a farther side within the scenery seen through the front windshield. On the contrary, the position at which the virtual image is visually recognized moves downward in the vertical direction of the front windshield, the virtual image is superimposed on scenery positioning on a closer side within the scenery seen through the front windshield.

Herein, the position of the viewpoint the user who sits on the driver's seat is not constant due to a sitting height of the user, a position of the driver's seat adjusted by the user, a sitting posture of the user, or the like. For example, in a case where a position at which the display image is projected is fixed, the virtual image is superimposed on scenery positioning on the closer side within the scenery seen through the front windshield as the position of the viewpoint of the user who sits on the driver's seat is higher. As described above, a target in the scenery on which the virtual image is superimposed is shifted when the position of the viewpoint of the user who sits on the driver's seat is changed. This may cause the user to feel discomfort.

In view of this, for example, PTL 1 discloses a head-up display device (vehicle display device) that adjusts a projecting direction of an optical system including a concave mirror in a projecting unit in accordance with a position of a viewpoint of a user who sits on a driver's seat of a vehicle. The vehicle display device disclosed in PTL 1 includes a concave mirror actuator for adjusting an angle of projection of the concave mirror of the projecting unit and a viewpoint detecting camera for acquiring the position of the viewpoint of the user who sits on the driver's seat of the vehicle.

The vehicle display device disclosed in PTL 1 controls the concave mirror actuator so that, in a case where the position of the viewpoint of the user who sits on the driver's seat of the vehicle, the position being acquired by the viewpoint detecting camera, is high, a display image is projected onto an upper part of a front windshield in a vertical direction. On the contrary, the vehicle display device disclosed in PTL 1 controls the concave mirror actuator so that, in a case where the position of the viewpoint of the user who sits on the driver's seat of the vehicle, the position being acquired by the viewpoint detecting camera, is low, a display image is projected onto a lower part of the front windshield in the vertical direction. Therefore, the vehicle display device disclosed in PTL 1 is configured to prevent a target on which a virtual image is superimposed within scenery seen through the front windshield from being greatly shifted even in a case where the position of the viewpoint of the user who sits on the driver's seat of the vehicle is changed. As a result, it is possible to reduce discomfort that the user feels.

CITATION LIST

Patent Literature(s)

PTL 1 JP-A-2014-210537

SUMMARY OF INVENTION

Technical Problem(s)

However, the inventors of the invention recognized that the vehicle display device disclosed in PTL 1 cannot satisfactorily eliminate a shift of a target on which a virtual image is superimposed within scenery seen through the front windshield. Hereinafter, this point will be described with reference to FIG. 6. FIG. 6 is a schematic view for describing a relationship among, in the vehicle display device disclosed in PTL 1, a viewpoint position of a user, a region in which the user can visually recognize a virtual image, and a range of a distance on a road surface in scenery on which inside of the region in which the user can visually recognize the virtual image is superimposed. Note that FIG. 6 exaggeratedly shows an amount of change in the viewpoint position of the user in order to clearly describe the relationship among the viewpoint position of the user in the vertical direction, the region in which the user can visually recognize the virtual image, and the range of the distance on the road surface in the scenery on which the region is superimposed. Specifically, distances between a user viewpoint position $101u$, a user viewpoint position $101r$, and a user viewpoint position $101d$ in the vertical direction, which are shown in FIG. 6, are actually shorter. Further, in axes of coordinates shown in FIG. 6, a z-axis positive direction indicates a vehicle forward direction, a y-axis positive direction indicates an upper part in the vertical direction, and an x-axis positive direction (upward direction vertical to the drawing) indicates a vehicle left direction.

FIG. 6 shows three viewpoint positions, i.e., the user viewpoint position 101u, the user viewpoint position 101r, and the user viewpoint position 101d as examples of the position of the viewpoint of the user who sits on the driver's seat of the vehicle. A virtual image region 301u shown in FIG. 6 is a region in which the user can visually recognize a virtual image as a result of adjusting an angle of projection of a display image by using the vehicle display device disclosed in PTL 1 when the viewpoint of the user who sits on the driver's seat of the vehicle is, for example, the user viewpoint position 101u. A virtual image region 301r shown in FIG. 6 is a region in which the user can visually recognize a virtual image as a result of adjusting an angle of projection of a display image by using the vehicle display device disclosed in PTL 1 when the viewpoint of the user who sits on the driver's seat of the vehicle is, for example, the user viewpoint position 101r. A virtual image region 301d shown in FIG. 6 is a region in which the user can visually recognize a virtual image as a result of adjusting an angle of projection of a display image by using the vehicle display device disclosed in PTL 1 when the viewpoint of the user who sits on the driver's seat of the vehicle is, for example, the user viewpoint position 101d. In the vehicle display device disclosed in PTL 1, when the position of the viewpoint of the user who sits on the driver's seat of the vehicle is changed, a direction in which a display image is projected is changed, but, for example, the display image itself displayed by a display (image display unit) is not changed. Thus, the virtual image region 301u, the virtual image region 301r, and the virtual image region 301d have the same length in the vertical direction.

A superimposed distance range 401u shown FIG. 6 is a range of a distance on a road surface 70 in scenery on which inside of the virtual image region 301u is superimposed within scenery seen through the front windshield when the viewpoint of the user who sits on the driver's seat of the vehicle is, for example, the user viewpoint position 101u. A superimposed distance range 401r shown in FIG. 6 is a range of a distance on the road surface 70 in scenery on which inside of the virtual image region 301r is superimposed within scenery seen through the front windshield when the viewpoint of the user who sits on the driver's seat of the vehicle is, for example, the user viewpoint position 101r. A superimposed distance range 401d shown in FIG. 6 is a range of a distance on the road surface 70 in scenery on which inside of the virtual image region 301d is superimposed within scenery seen through the front windshield when the viewpoint of the user who sits on the driver's seat of the vehicle is, for example, the user viewpoint position 101d.

As in the example shown in FIG. 6, an amount of change in the virtual image region in the vertical direction is smaller than an amount of change in the viewpoint position of the user in the vertical direction. With this, an angle between a line of sight in which the user sees the virtual image region and a horizontal surface is increased as the user viewpoint position moves upward in the vertical direction. On the contrary, the angle between the line of sight in which the user sees the virtual image region and the horizontal surface is reduced as the user viewpoint position moves downward in the vertical direction. Therefore, a length of the superimposed distance range 401u at the user viewpoint position 101u that is a position higher than the user viewpoint position 101r is smaller than a length of the superimposed distance range 4 at the user viewpoint position 101r. Further, a length of the superimposed distance range 401d at the user viewpoint position 101d that is a position lower than the user viewpoint position 101r is larger than the length of the superimposed distance range 401r at the user viewpoint position 101r. Note that, in FIG. 6, positions of end portions of the superimposed distance range 401u, the superimposed distance range 401r, and the superimposed distance range 401d on a backward side of the vehicle are only changed. However, actually, positions of end portions thereof on a forward side of the vehicle are also changeable.

As described above, in the vehicle display device disclosed in PTL 1, when the position of the viewpoint of the user who sits on the driver's seat is changed, a range of a distance on a road surface in scenery on which a virtual image can be superimposed within scenery seen through the front windshield is changed. As a result, the inventors of the invention recognized that, in the vehicle display device disclosed in PTL 1, when the position of the viewpoint of the user is changed, a target in scenery on which, in particular, a virtual image visually recognized in the vicinity of an upper edge portion or a lower edge portion in the vertical direction of a virtual image region is superimposed within scenery seen through the front windshield may be shifted.

An object of the invention is to provide a vehicle display device capable f providing appropriate information to a user without being influenced by a change in a position of a viewpoint of the user. Another object of the invention will be apparent to a person skilled in the art with reference to a mode and a preferred embodiment exemplified below and attached drawings.

Solution to Problem(s)

A first aspect according to the invention relates to a vehicle display device including:

an image display unit including a display screen capable of displaying an image;

an image generating unit configured to generate the image displayed by the image display unit;

a viewpoint position acquiring unit configured to acquire a position of a viewpoint of a user who sits on a driver's seat of a vehicle; and a projecting unit configured to project the image onto a light transmitting member of the vehicle so that, when the image is reflected on the light transmitting member of the vehicle, the user who sits on the driver's seat can visually recognize a virtual image, wherein the image generating unit determines a usage region to be used to display the image as a part of the display screen of the image display unit in accordance with the position of the viewpoint of the user acquired by the viewpoint position acquiring unit.

In the vehicle display device, the virtual image visually recognized by the user is such that the image displayed on the usage region within the display screen of the image display unit is reflected by the light transmitting member such as a front windshield. Thus, the region in which the virtual image is formed corresponds to the usage region that is a part of the display screen. Herein, the image generating unit determines the usage region that is a part of the display screen of the image display unit in accordance with the position of the viewpoint of the user acquired by the viewpoint position acquiring unit. As a result, the vehicle display device according to the first aspect can adjust not only a position of the region in which the virtual image is formed but also a size of the region in which the virtual image is formed. The vehicle display device according to the first aspect can deal with a shift of a target in scenery on which the virtual image is superimposed, as compared to, for example, a vehicle display device capable of adjusting only a position of a region in which a virtual image is formed by changing an angle of projection or the like of a concave mirror of a projecting unit. Therefore, the vehicle display device according to the first aspect can provide appropriate information to the user without being influenced by a change in the position of the viewpoint of the user.

In a second aspect according to the invention, in the first aspect, the image generating unit may determine a position of the usage region in a direction corresponding to a vertical direction and a length of the usage region in the direction corresponding the vertical direction in accordance with the position of the viewpoint of the user in the vertical direction acquired by the viewpoint position acquiring unit.

The image generating unit determines the position of the usage region of the display screen in the direction corresponding to the vertical direction and the length of the usage region thereof in the direction corresponding to the vertical direction in accordance with the position of the viewpoint of the user in the vertical direction acquired by the viewpoint position acquiring unit, and therefore it is possible to cause a range of a distance on a road surface in scenery on which inside of the region in which the virtual image is formed is superimposed to be constant without being influenced by a change in the viewpoint position of the user in the vertical direction. When the range of the distance on the road surface in the scenery on which the inside of the region in which the virtual image is formed is superimposed is constant, the shift of the target in the scenery on which the virtual image visually recognized by the user is superimposed is dealt with.

In a third aspect according to the invention, in the first or second aspect, as the position of the viewpoint of the user acquired by the viewpoint position acquiring unit moves upward in a vertical direction, the image generating unit may determine that a position of the usage region in a direction corresponding to the vertical direction is in a direction corresponding to an upper side in the vertical direction and may determine that the length of the usage region in the direction corresponding to the vertical direction is long, and as the position of the viewpoint of the user acquired by the viewpoint position acquiring unit moves downward in the vertical direction, the image generating unit may determine that the position of the usage region in the direction corresponding to the vertical direction is in a direction corresponding to a lower side in the vertical direction and may determine that the length of the usage region in the direction corresponding to the vertical direction is short.

In the third aspect, the image generating unit can appropriately determine the position of the usage region of the display screen in the direction corresponding to the vertical direction and the length of the usage region thereof in the direction corresponding to the vertical direction in accordance with the position of the viewpoint of the user in the vertical direction.

In a fourth aspect according to the invention, in any one of the first to third aspects, the image generating unit may determine a length of the usage region in a direction corresponding to a vertical direction and a length of the usage region in a direction corresponding to a left-right direction of the vehicle in accordance with the position of the viewpoint of the user in a forward-backward direction of the vehicle acquired by the viewpoint position acquiring unit.

The image generating unit determines the length of the usage region of the display screen in the direction corresponding to the vertical direction and the length of the usage region thereof in the direction corresponding to the left-right direction of the vehicle in accordance with the position of the viewpoint of the user in the forward-backward direction of the vehicle acquired by the viewpoint position acquiring unit, and therefore it is possible to cause the range of the scenery on which the inside of the region in which the virtual image is formed is superimposed to be constant without being influenced by a change in the position of the viewpoint of the user in the vehicle forward-backward direction. When the range of the scenery on which the inside of the region in which the virtual image is formed is superimposed is constant, the shift of the target in the scenery on which the virtual image visually recognized by the user is superimposed is eliminated.

In a fifth aspect according to the invention, in any one of the first to fourth aspects, as the position of the viewpoint of the user acquired by the viewpoint position acquiring unit moves in a forward direction of the vehicle, the image generating unit may determine that both a length of the usage region in a direction corresponding to a vertical direction and a length of the usage region in a direction corresponding to a left-right direction of the vehicle are short, and as the position of the viewpoint of the user acquired by the viewpoint position acquiring unit moves in a backward direction of the vehicle, the image generating unit may determine that both the length of the usage region in the direction corresponding to the vertical direction and the length of the usage region in the direction corresponding to the left-right direction of the vehicle are long.

In the fifth aspect, the image generating unit can appropriately determine the length of the usage region of the display screen in the vehicle left-right direction and the length of the usage region thereof in the vertical direction in accordance with the position of the viewpoint of the user in the vehicle forward-backward direction.

In a sixth aspect according to the invention, in any one of the first to fifth aspects, the image generating unit may determine the usage region so that a range of a distance on a road surface in scenery on which the virtual image is superimposed within scenery seen by the user through the window panel is constant without being influenced by a change in the position of the viewpoint of the user.

When the range of the distance on the road surface in the scenery on which the virtual image is superimposed is constant without being influenced by a change in the viewpoint position of the user, it is possible to provide appropriate information to the user.

BRIEF DESCRIPTION OF DRAWINGS

FIG. 1B shows an example of a configuration of an image display unit shown in FIG. 1A.

FIG. 3 is a flowchart showing an example of operation of the vehicle display device shown in FIG. 1A.

FIG. 4A shows a relationship between a position of a viewpoint of a user and an image displayed by the image display unit of the vehicle display device shown in FIG. 1A.

FIG. 4B shows a relationship between a position of a viewpoint of a user and an image displayed by the image display unit of the vehicle display device shown in FIG. 1A.

FIG. 4C shows a relationship between a position of a viewpoint of a user and an image displayed by the image display unit of the vehicle display device shown in FIG. 1A.

FIG. 4D shows a relationship between a position of a viewpoint of a user and an image displayed by the image display unit of the vehicle display device shown in FIG. 1A.

FIG. 4E shows a relationship between a position of a viewpoint of a user and an image displayed by the image display unit of the vehicle display device shown in FIG. 1A.

FIG. 5 is a schematic view for describing, in the vehicle display device of the invention, a relationship among a viewpoint position of a user, a region in which the user can visually recognize a virtual image, and a range of a distance on a road surface in scenery on which inside of the region in which the user can visually recognize the virtual image is superimposed.

FIG. 6 is a schematic view for describing, in a vehicle display device disclosed in PTL 1 (JP-A-2014-210537), a relationship among a viewpoint position of a user, a region in which the user can visually recognize a virtual image, and a range of a distance on a road surface in scenery on which inside of the region in which the user can visually recognize the virtual image is superimposed.

DESCRIPTION OF EMBODIMENTS

A preferred embodiment described below is used to easily understand the invention. Therefore, a person skilled in the art should consider that the invention is not wrongfully limited by the embodiment described below.

Figure 1A:
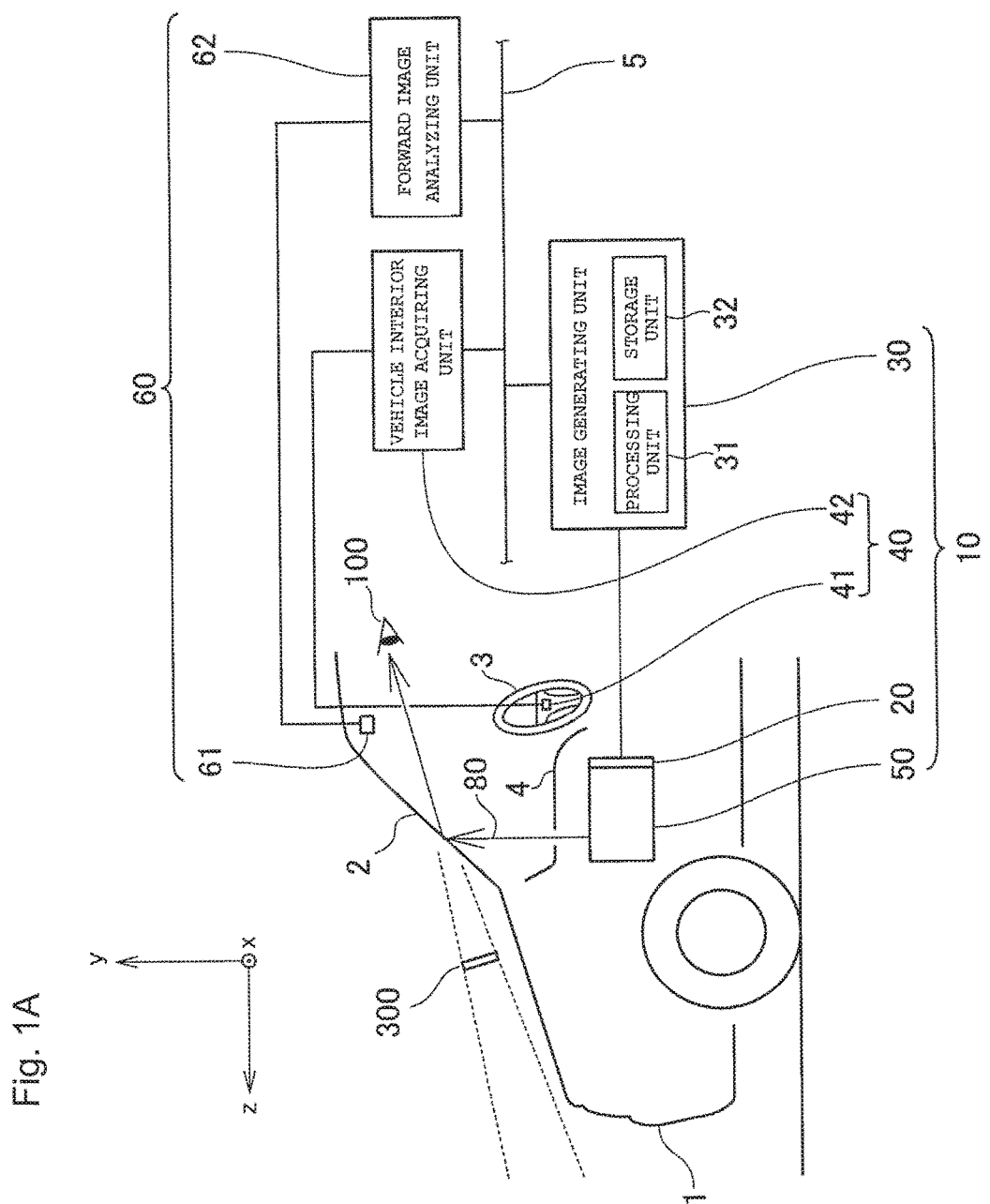
FIG. 1A is a block diagram showing an example of a configuration of a vehicle display device of the invention.

An example of the whole configuration of a vehicle display device 10 of the invention will be described with reference to FIG. 1A, FIG. 1B, and FIG. 1C. In order to simplify the following description, as shown in FIG. 1A, in a real space, for example, a z-axis is defined as a vehicle forward-backward direction obtained when a direction of travel of a vehicle 1 is set to a vehicle forward direction, a y-axis is defined as a vertical direction, and an x-axis is defined as a left-right direction (vehicle left-right direction) obtained when the vehicle is directed in the vehicle forward direction. At this time, the x-axis direction indicates a vehicle left direction, a y-axis positive direction indicates an upper part in the vertical direction, and a z-axis positive direction indicates the vehicle forward direction.

As shown in FIG. 1A, the vehicle display device 10 includes an image display unit 20, an image generating unit 30, a viewpoint position acquiring unit 40, and a projecting unit 50. The vehicle display device 10 may further include, for example, a forward information acquiring unit 60 including a forward image acquiring unit 61 and a forward image analyzing unit 62.

The image display unit 20 includes a display screen 21 capable of displaying an image. A region 210 capable of displaying an image in the display screen 21 is referred to as "display region 210", for example. As shown in FIG. 1B, an example of the display screen 21 is, for example, a liquid crystal panel 21 including a plurality of pixels 22. In the liquid crystal panel 21, the display region 210 is, for example, the pixels 22 in the whole liquid crystal panel 21. An example of the image display unit 20 is, for example, a liquid crystal panel module 20 including the liquid crystal panel 21 and a drive circuit 26 of the liquid crystal panel 21.

For example, when a signal indicating an image generated by the image generating unit 30 is input, the image display unit 20 displays the image by using at least a part of the pixels 22 of the display screen 21 within the display region 210 of the display screen 21 in accordance with the input signal. Note that, although, in the following description, description will be made by using the liquid crystal panel module 20 as an example of the image display unit 20 as appropriate, the image display unit 20 maybe another display device. For example, the image display unit 20 may be a light-emitting display panel module such as an organic EL (Electro Lumine scence) element, may be a reflective display panel module such as a DMD (Digital Micromirror Device) or an LCoS (Liquid Crystal on Silicon) (registered trademark), or may be a scanning display device for scanning laser light.

In order simplify the following description, as shown in FIG. 1B, in a viewpoint in which the display screen 21 of the image display unit 20 is seen from the front, for example, an Ix-axis is defined as a horizontal direction of the display screen 21, and an Iy-axis is defined as a vertical direction of the display screen 21. At this time, an Ix-axis positive direction indicates a left direction of the display screen 21, and an Iy-axis positive direction indicates an upward direction of the display screen 21.

The viewpoint position acquiring unit 40 includes, for example, a vehicle interior image acquiring unit 41 and a vehicle interior image analyzing unit 42. The viewpoint position acquiring unit 40 acquires a viewpoint position 100 of a user who sits on a driver's seat of the vehicle 1. Hereinafter, the viewpoint position 100 of the user who sits on the driver's seat of the vehicle 1 is also referred to as "user viewpoint position 100". The viewpoint position acquiring unit 40 is configured to acquire the user viewpoint position 100 in at least one direction of the y-axis direction and the z-axis direction. The viewpoint position acquiring unit 40 may be configured to acquire the user viewpoint position 100 in both the y-axis direction and the z-axis direction.

The vehicle interior image acquiring unit 41 is, for example, an in-vehicle camera for capturing an image of an interior of the vehicle. The vehicle interior image acquiring unit 41 may be, for example, a common in-vehicle camera attached for the purpose of preventing vehicle theft or the like or may be, for example, an in-vehicle camera exclusive to the vehicle display device 10. It is preferable that the vehicle interior image acquiring unit 41 capture an image of the user viewpoint position 100 from a side lower than the user viewpoint position 100 in the vertical direction and may be attached to, for example, a steering handle 3 or the like. Further, it is preferable that the vehicle interior image acquiring unit 41 can capture an infrared image so that the user viewpoint position 100 can be acquired even in a case where the interior of the vehicle is dark. Furthermore, the viewpoint position acquiring unit 40 may be, for example, a stereo camera in order to configure the viewpoint position acquiring unit 40 so that the user viewpoint position 100 in at least the z-axis direction can be acquired. The vehicle interior image acquiring unit 41 outputs, for example, the acquired image of the interior of the vehicle to the vehicle interior image anal unit 42.

The vehicle interior image analyzing unit 42 analyzes the input image of the interior of the vehicle with the use of, for example, publicly-known image processing or a pattern matching method. As a result of analyzing an input image of a side in front of the vehicle, when a face of the user who sits on the driver's seat is included in the input image of the interior of the vehicle, the vehicle interior image analyzing unit 42 specifies, for example, coordinates (y, z) of the user viewpoint position 100 in the real space, thereby acquiring the user viewpoint position 100. The vehicle interior image analyzing unit 42 outputs, for example, the acquired user viewpoint position 100 to the image generating unit 30 via a bus 5 of a CAN (Controller Area Network) bus communication or the like. Herein, the vehicle interior image analyzing unit 42 may be included in, for example, the in-vehicle camera, or the image generating unit 30 may have a function of the vehicle interior image analyzing unit 42. Further, the viewpoint position acquiring unit 40 may acquire the user viewpoint. position 100 in the vehicle forward-backward direction by acquiring the user viewpoint position 100 in the vertical direction with the use of the in-vehicle camera and inputting a signal from a sensor (not shown) for detecting a seat position. Furthermore, the image generating unit 30 may directly input the user viewpoint position 100 from the vehicle interior image analyzing unit 42, instead of inputting the user viewpoint position via the bus 5.

The forward information acquiring unit 60 includes, for example, the forward image acquiring unit 61 and the forward image analyzing unit 62. The forward information acquiring unit 60 acquires, for example, position information on a traffic lane of a road in the vehicle forward direction, position information of another vehicle, an obstacle, or the like existing in the vehicle forward direction, and information on the side in front of the vehicle such as information on a traffic sign in the vehicle forward direction.

The forward image acquiring unit 61 is, for example, a vehicle exterior camera for capturing an image of the side in front of the vehicle. The forward image acquiring unit 61 may be, for example, a common vehicle exterior camera for use in a drive recorder or the like or may be, for example, a vehicle exterior camera exclusive to the vehicle display device 10. Further, the vehicle exterior camera may be a monocular camera. However, in order to accurately acquire a distance between an object existing in front of the vehicle and the own vehicle 1, the vehicle exterior camera is preferably a stereo camera. Further, the vehicle exterior camera may capture an infrared image so that the image of the side in front of the vehicle can be captured even in a case where the side in front of the vehicle is dark. The forward image acquiring unit 61 outputs, for example, the acquired image of the side in front of the vehicle to the forward image analyzing unit 62.

The forward image analyzing unit 62 analyzes the input image of the side in front of the vehicle with the use of, for example, publicly-known image processing or a pattern matching method. The forward image analyzing unit 62 analyzes the input image of the side in front of the vehicle, thereby acquiring forward information on a shape of a road in front of the vehicle (traffic lane, white line, stop line, crosswalk, width of road, the number of traffic lanes, intersection, curve, fork, and the like). Further, the forward image analyzing unit 62 analyzes the input image of the side in front of the vehicle, thereby acquiring forward information such as a position and a size of another vehicle, an obstacle, or the like existing in front of the vehicle, a distance from the own vehicle 1, and a relative velocity to the own vehicle 1. The forward image analyzing unit 62 outputs, for example, the acquired forward information to the image generating unit 30 via the bus 5. Herein, the forward image analyzing unit 62 may be included in, for example, the vehicle exterior camera, or the image generating unit 30 may have a function of the forward image analyzing unit 62. Further, the image generating unit 30 may directly input the forward information from the forward image analyzing unit 62, instead of inputting the forward information via the bus 5.

Further, the forward information acquiring unit 60 may include a laser radar, a millimeter radar, an ultrasonic sensor, another publicly-known sensor, or the like, instead of the forward image acquiring unit 61 or together with the forward image acquiring unit 61. At this time, the forward image analyzing unit 62 may acquire the above-mentioned forward information by inputting data output by the laser radar, the millimeter radar, the ultrasonic sensor, the publicly-known sensor, or the like and analyzing the data, instead of the image of the side in front of the vehicle or together with the image of the side in front of the vehicle.

Furthermore, in FIG. 1A, the vehicle interior image acquiring unit 41 and the forward image acquiring unit 61 are shown to be attached to different places in the vehicle 1. However, the vehicle interior image acquiring unit 41 and the forward image acquiring unit 61 are not necessarily limited thereto and may be attached to the same place in the vehicle 1. Further, the vehicle interior image acquiring unit 41 and the forward image acquiring unit 61 may be provided in the same housing.

The image generating unit 30 includes a processing unit 31 and a storage unit 32. The processing unit 31 includes, for example, one or a plurality of microprocessors, a microcontroller, an ASIC (Application Specific Integrated Circuit), an FPGA (Field-Programmable Gate Array), and another arbitrary IC (Integrated Circuit). The storage unit 32 includes, for example, one or a plurality of memories capable of storing a program and/or data, such as a rewritable RAM (Random Access Memory), a read-only ROM (Read Only Memory), an inerasable program read-only EEPROM (Electrically Erasable Programmable Read-Only Memory), and a flash memory that is a nonvolatile memory.

The image generating unit 30 generates, for example, an image to be displayed by the image display unit 20 by causing the processing unit 31 to execute a program stored on the storage unit 32. The image generating unit 30 can cause the image to be generated to include a notification mark capable of notifying the user that, for example, a notification target such as another vehicle, an obstacle, or the like exists on a road in front of the vehicle in accordance with forward information input from the forward information acquiring unit 60. Further, the image generating unit. 30 can cause the image to be generated to include, for example, a navigation mark capable of providing route information to the user from a navigation device (not shown) via the bus 5 or in accordance with a signal that is directly input. In addition, the image generating unit 30 can further cause the image to be generated to include, for example, another kind of information such as vehicle information including an amount of remaining fuel, a current vehicle speed, fuel consumption, an amount of remaining battery, and the like from another ECU (Electronic Control Unit) (not shown) or the like via the bus 5 or in accordance with information that is directly input. Note that the image generating unit 30 may generate an image including only such another information.

Further, the image generating unit 30 determines a usage region 220 that is a part to be used to display an image within the display region 210 of the display screen 21 of the image display unit 20 in accordance with the user viewpoint position 100 input from the viewpoint position acquiring unit 40. In the example of the image display unit 20 shown in FIG. 1B, the usage region 220 is, for example, a range 220 of the pixels 22 to be used to display an image within the display region 210 that is the whole pixels 22 of the liquid crystal panel 21.

For example, a table in which the user viewpoint position 100 and a parameter for determining the usage region 220 corresponding to the user viewpoint position 100 are associated with each other is stored on the storage unit 32 of the image generating unit 30. The image generating unit 30 determines the usage region 220 corresponding to the user viewpoint position 100 to be input by, for example, causing the processing unit 31 to refer to the table.

Further, for example, an arithmetic expression for determining the usage region 220 corresponding to the user viewpoint position 100 is stored on the storage unit 32 of the image generating unit 30. The image generating unit 30 determines the usage region 220 corresponding to the user viewpoint position 100 to be input by, for example, causing the processing unit 31 to calculate the arithmetic expression. A relationship between the user viewpoint position 100 and the usage region 220 corresponding to the user viewpoint position 100 will be described below.

The projecting unit projects an image displayed by the image display unit 20 onto a light transmitting member 2 such as a front windshield 2 of the vehicle 1. Light 80 constituting the projected image is reflected by the front windshield 2 toward the interior of the vehicle. Hereinafter, the light 80 constituting the image is also referred to as "image light 80". The projecting unit 50 projects an image so that the image light 80 reflected by the front windshield 2 is incident on the user viewpoint position 100. Further, the light transmitting member 2 of the vehicle 1 may be a combiner provided in the vehicle 1.

When the image light 80 is incident on the user viewpoint position 100, the user who sits on the driver's seat can visually recognize a virtual image 310 formed on the side in front of the vehicle via the front windshield 2. The user can visually recognize, for example, the virtual image 310 in a state in which at least a part of a scene seen through the front windshield 2 and the virtual image 310 are superimposed. The virtual image 310 includes, for example, a virtual image notification mark 320 that is a virtual image of the above-mentioned notification mark, a virtual image navigation mark 340 that is a virtual image of the above-mentioned navigation mark, and a virtual image mark of the above-mentioned another mark.

An example of a structure of the projecting unit 50 will be described with reference to FIG. 1C. The projecting unit 50 houses, for example, an optical system such as a plane mirror 54 and a concave mirror 55 and an actuator 56 inside a housing 51. The housing 51 is placed in, for example, a dashboard 4 of the vehicle 1 and includes an upper case 52 and a lower case 53 made of black light-shielding synthetic resin or the like. An upper case opening 52a is provided in a substantially middle portion of the upper case 52 in the z-axis direction. The upper case opening 52a is covered with, for example, a transparent cover 57 made of transparent light-transmitting synthetic resin or the like. For example, a lower case opening 53a is provided on a vehicle backward side of the lower case 53. The lower case opening 53a is provided in the lower case 53 so that, for example, the image light 80 emitted from the display screen 21 of the image display unit 20 attached to outside of the housing 51 can be incident.

The plane mirror 54 is attached on, for example, the vehicle backward side of the lower case 53 via an attachment member (not shown). For example, a position of attachment and an angle of attachment of the plane mirror 54 are fixed so that the image light 80, which is emitted from the display screen 21 and is incident through the lower case opening 53a, is reflected in the vehicle forward direction.

The concave mirror 55 is attached to, for example, the lower case 53 via the actuator 56 so as to be closer to a forward side of the vehicle than the plane mirror 54. An angle of attachment of the concave mirror 55 is rotatable by the actuator 56 by setting, for example, the x-axis as a rotation axis. A position of the concave mirror 55 is fixed so that, for example, the image light 80 reflected by the plane mirror 54 is incident, and the angle of attachment is slightly adjusted so that the incident image light 80 is reflected toward the front windshield 2. Note that, for example, the table or arithmetic expression for determining the user viewpoint position 100 stored on the storage unit 32 of the image generating unit 30 and the usage region 220 corresponding to the user viewpoint position 100 is corrected in accordance with the angle of attachment.

The actuator 56 includes, for example, a motor, a speed reduction mechanism, a concave mirror rotating member, and a support member of the concave mirror 55 (all not shown). For example, the actuator 56 is attached below the concave mirror 55 in the vertical direction to the lower case 53 via an attachment member (not shown). The actuator 56 rotates the motor in accordance with a signal input from an actuator control unit (not shown), reduces rotation of the motor by using the speed reduction mechanism, and transmits the rotation to the concave mirror rotating member, thereby rotating the concave mirror 55. Note that the actuator 56 is not necessarily provided.

Figure 1C:
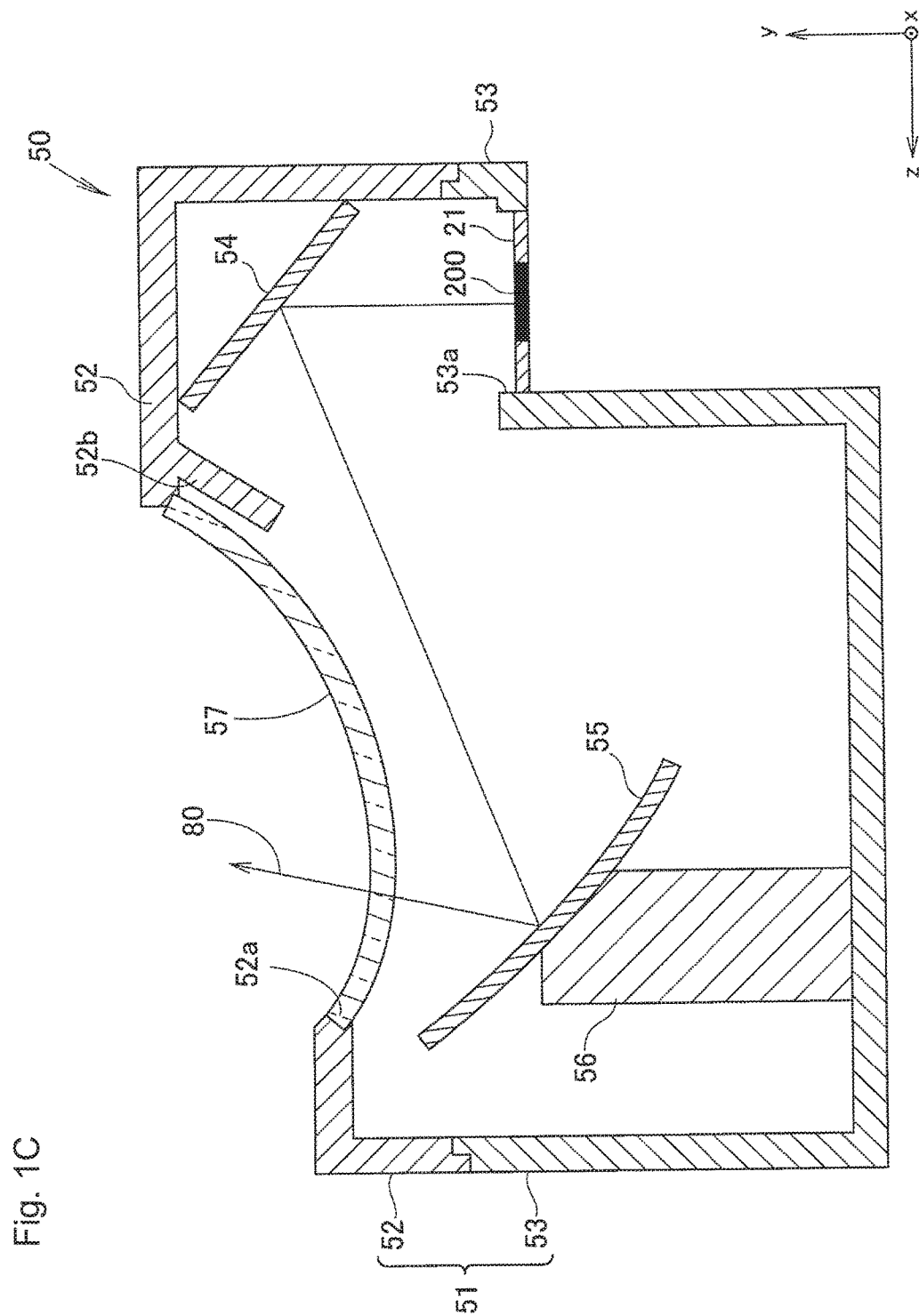
FIG. 1C is a cross-sectional view of a projecting unit shown in FIG. 1A.

Further, light shielding unit 52b is provided in the upper case 52 of the housing 51 in FIG. 1C between the upper case opening 52a and the plane mirror 54. The light shielding unit 52b is provided to, for example, prevent light from the outside of the housing 51, the light being incident through the upper case opening 52a, from travelling to the image display unit 20. An example of the structure of the projecting unit 50 that has been described with reference to FIG. 1C is merely an example and does not restrict the structure of the projecting unit 50 of the vehicle display device 10.

Figure 2:
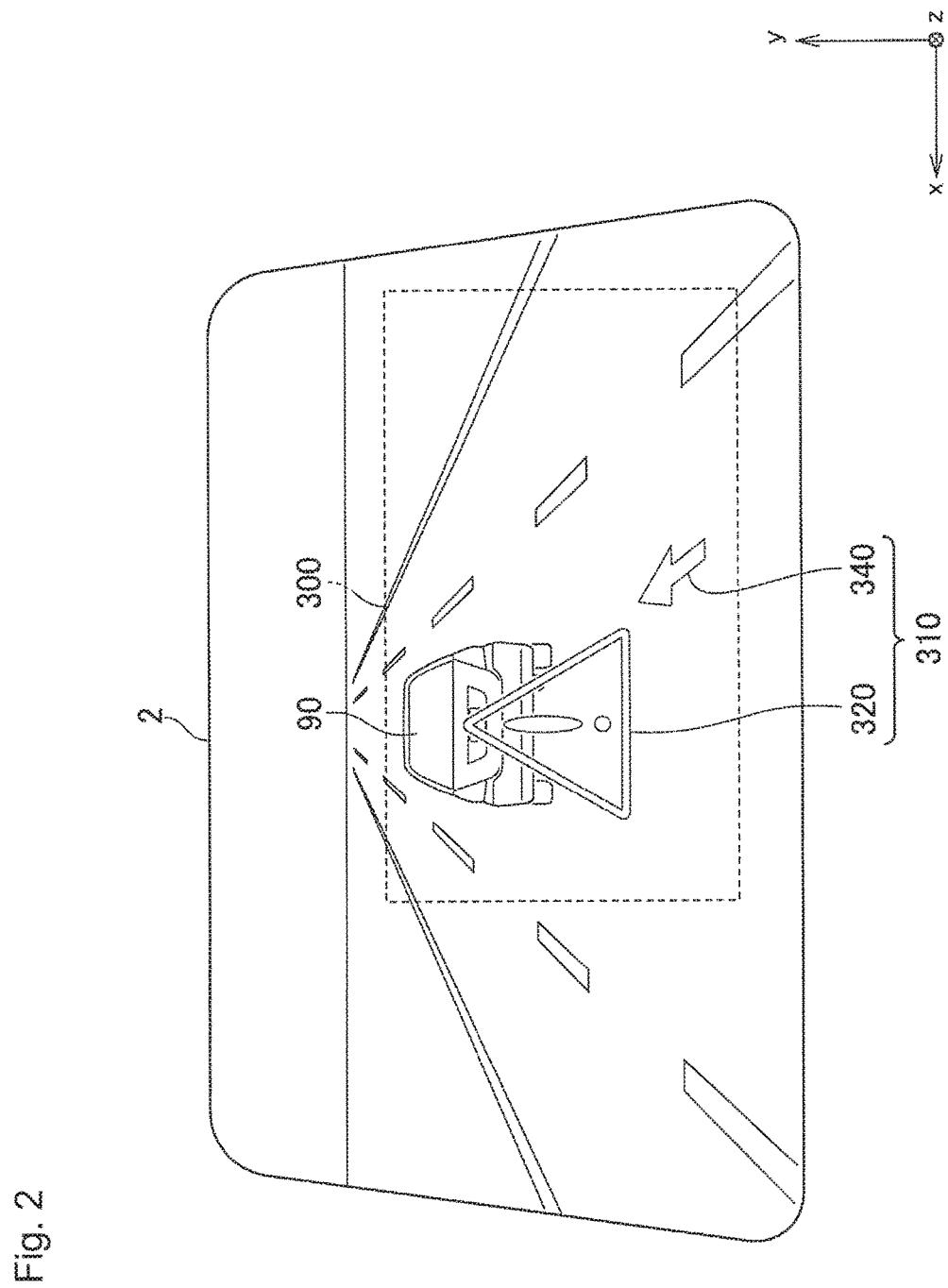
FIG. 2 shows an example of scenery and a virtual image seen from a user who sits on a driver's seat of a vehicle including the vehicle display device shown in FIG. 1A.

FIG. 2 shows an example of scenery and the virtual image 310 that can be seen by the user who sits on a driver's seat of the vehicle 1 through the front windshield 2. In the example shown in FIG. 2, a three-lane road extending in front of the vehicle and another vehicle (forward vehicle) 90 existing in front of the vehicle are shown as the example of the scenery seen through the front windshield 2. In the example of the scenery seen through the front windshield 2 shown in FIG. 2, the notification target is the forward vehicle 90. In the example shown in FIG. 2, the virtual image notification mark 320 is included in the virtual image 310. In the example shown in FIG. 2, the virtual image notification mark 320 is visually recognized by the user while being superimposed on the forward vehicle 1. Further, in the example shown in FIG. 2, the virtual image navigation mark 340 is included in the virtual image 310.

Further, in the example shown in FIG. 2, a region 300 is a region 300 corresponding to the usage region 220 in the display screen 21 of the image display unit 20. Hereinafter, the region 300 corresponding to the usage region 220 in the display screen 21 of the image display unit 20 is also referred to as "virtual image region 300". That is, the virtual image region 300 is a region in which the user can visually recognize the virtual image 310.

Further, the Ix-axis positive direction in the display screen 21 of the image display unit 20 in FIG. 1B corresponds to, for example, an x-axis positive direction in the virtual image region 300, i.e., the vehicle left direction. Similarly, the Iy-axis positive direction in the display screen 21 of the image display unit 20 in FIG. 1B corresponds to, for example, the y-axis positive direction in the virtual image region 300, i.e., an upper side in the vertical direction.

An example of operation of the vehicle display device 10 will be described with reference to FIG. 3. The operation of the vehicle display device 10 is started when, for example, power supply of the vehicle 1 is turned on, when an engine (not shown) is driven, or when a predetermined waiting time passes after the power supply of the vehicle 1 is turned on or the engine is driven.

In Step S01, the forward information acquiring unit 60 acquires forward information. In Step S02, the viewpoint position acquiring unit 40 acquires the user viewpoint position 100. Note that Step S01 and Step S02 are not necessarily performed in this order, and the order may be switched.

In Step S03, the image generating unit 30 generates an image including, for example, a notification mark, a navigation mark, and another mark in accordance with the forward information acquired by the forward information acquiring unit 60 in Step S01. Note that the image generating unit 30 does not need to generate an image based on the user viewpoint position 100.

In Step S04, the image generating unit 30 determines a usage region within the display region 210 of the display screen 21 of the image display unit 20 in accordance with the user viewpoint position 100 acquired by the viewpoint position acquiring unit 40 in Step S02. Note that Step S03 and Step S04 are not necessarily performed in this order, and the order may be switched.

In Step S05, the image display unit 20 displays the image generated in Step S03 with the use of the total number of pixels 22 in the usage region 220 determined by the image generating unit 30 in Step S04. When the processing in Step S05 is executed, the flow returns to "Start". Herein, a predetermined waiting time may be inserted between completion of execution of the processing in Step S05 and returning of the flow to "Start" so that the flowchart shown in FIG. 3 is repeatedly executed at each predetermined interval set in advance.

The relationship between the user viewpoint position 100 and the usage region 220 corresponding to the user viewpoint position 100 will be described with reference to FIG. 4A, FIG. 4B, FIG. 4C, FIG. 4D, FIG. 4E, and FIG. 5. On left sides of FIG. 4A, FIG. 4B, FIG. 4C, FIG. 4D, and FIG. 4E, axes of coordinates indicating the user viewpoint position 100 on the y-axis and the z-axis in the real space are shown. Further, on right sides of FIG. 4A, FIG. 4B, FIG. 4C, FIG. 4D, and FIG. 4E, the usage region 220 used to display an image within the display region 210 of the display screen 21 of the image display unit 20, the usage region being determined by the image generating unit 30, is shown to correspond to the user viewpoint position 100 on the y-axis and the z-axis in the real space.

FIG. 5 is a schematic view for describing, in the vehicle display device 10 in the vertical direction, a relationship among the user viewpoint position 100 in the vertical direction, the virtual image region 300, and a range of a distance on a road surface 70 in scenery on which inside of the virtual image region 300 is superimposed. Note that FIG. 5 exaggeratedly shows an amount of change in the user viewpoint position 100 in order to clearly describe the relationship among the user viewpoint position 100 in the vertical direction, the virtual image region 300, and the range of the distance on the road surface 70 in the scenery on which the inside of the virtual image region 300 is superimposed. Specifically, a distance between a user viewpoint position 100r and a user viewpoint position 100u in the vertical direction and a distance between the user viewpoint position 100r and a user viewpoint position 100d in the vertical direction, which are shown in FIG. 5, are actually shorter. As a result, a virtual image region 300r, a virtual image region 300u, and a virtual image region 300d are shown in FIG. 5 so that the virtual image regions are not overlapped with one another. However, as shown in FIG. 4B and FIG. 4C, actually, at least parts of the virtual image region 300r and parts of the virtual image region 300u and parts of the virtual image region 300r and the virtual image region 300d are overlapped with each other. Hereinafter, the range of the distance on the road surface 70 in the scenery on which the inside of the virtual image region 300 is superimposed is also referred to as "superimposed distance range 400".

In FIG. 5, the virtual image region 300r at the user viewpoint position 100r shown in FIG. 4A, the virtual image region 300u at the user viewpoint position 100u shown in FIG. 4B, and the virtual image region 300d at the user viewpoint position 100d shown in FIG. 4C are shown. Further, in FIG. 5, a superimposed distance range 400r that is a range of a distance on the road surface 70 in the scenery on which inside of the virtual image region 300r is superimposed within the scenery seen through the front windshield 2 at the user viewpoint position 100r, a superimposed distance range 400u that is a range of a distance on the road surface 70 in the scenery on which inside of the virtual image region 300u is superimposed within the scenery seen through the front windshield 2 at the user viewpoint position 100u, and a superimposed distance range 400d that is a range of a distance on the road surface 70 in the scenery on which inside of the virtual image region 300d is superimposed within the scenery seen through the front windshield 2 at the user viewpoint position 100d are shown.

A relationship between the user viewpoint position 100 in the vertical direction and the usage region 220 corresponding to the user viewpoint position 100 in the vertical direction will be described. The user viewpoint position 100r shown in FIG. 4A is indicated at an intersection of the y-axis and the z-axis in the axes of coordinates in FIG. 4A. Hereinafter, the user viewpoint position 100r shown in FIG. 4A is also referred to as "reference user viewpoint position 100r". For example, when the user viewpoint position 100 acquired in Step S02 shown in FIG. 3 is the reference user viewpoint position 100r, in Step S04 shown in FIG. 3, the image generating unit 30 determines the usage region 220 within the display region 210 of the display screen 21 of the image display unit 20 as a usage region 220r shown in FIG. 4A. Hereinafter, the usage region 220r corresponding to the reference user viewpoint position 100r, which is shown in FIG. 4A, is also referred to as "reference usage region 220r".

The user viewpoint position 100u shown in FIG. 4B is an example of the user viewpoint position 100 positioning on an upper side in the vertical direction, as compared to the reference user viewpoint position 100r. For example, when the user viewpoint position 100 acquired in Step S02 shown in FIG. 3 is the user viewpoint position 100u, in Step S04 shown in FIG. 3, the image generating unit 30 determines the usage region 220 within the display region 210 of the display screen 21 of the image display unit 20 as a usage region 220u shown in FIG. 4B.

The usage region 220u shown in FIG. 4B positions on a side in the Iy-axis positive direction, as compared to the reference usage region 220r. Further, a length 221u of the usage region 220u shown in FIG. 4B in the Iy-axis direction is longer than a length 221r of the reference usage region 220r in the Iy-axis direction. As a result, as shown in FIG. 5, the virtual image region 300u corresponding to the usage region 220u positions on the upper side in the vertical direction in the real space and a length thereof in the vertical direction in the real space is increased, as compared to the virtual image region 300*r* corresponding to the reference usage region 220*r*. Note that the usage region 220*u* is overlapped with a part of the reference usage region 220*r*.

That is, it is determined that a position of the usage region 220 of the display screen 21 is positioned on the side in the Iy-axis positive direction as the user viewpoint position 100 detected by the viewpoint position acquiring unit 40 moves upward in the vertical direction. Further, it is determined that a length of the usage region 220 of the display screen 21 in the Iy-axis direction is increased as the user viewpoint position 100 detected by the viewpoint position acquiring unit 40 moves upward in the vertical direction. As a result, the virtual image region 300 positions on the upper side in the vertical direction in the real space and a length thereof in the vertical direction in the real space is increased as the user viewpoint position 100 detected by the viewpoint position acquiring unit 40 moves upward in the vertical direction.

The user viewpoint position 100*d* shown in FIG. 4C is an example of the user viewpoint position 100 positioning on a lower side in the vertical direction, as compared to the reference user viewpoint position 100*r*. For example, when the user viewpoint position 100 acquired in Step S02 shown in FIG. 3 is the user viewpoint position 100*d*, in Step S04 shown in FIG. 3, the image generating unit 30 determines the usage region 220 within the display region 210 of the display screen 21 of the image display unit 20 as a usage region 220*d* shown in FIG. 4C.

The usage region 220*d* shown in FIG. 4C positions on a side in an Iy-axis negative direction, as compared to the reference usage region 220*r*. Further, a length 221*d* of the usage region 220*d* shown in FIG. 4C in the Iy-axis direction is shorter than the length 221*r* of the reference usage region 220*r* in the Iy-axis direction. As a result, as shown in FIG. 5, the virtual image region 300*d* corresponding to the usage region 220*d* shown in FIG. 4C positions on the lower side in the vertical direction in the real space and a length thereof in the vertical direction in the real space is short, as compared to the virtual image region 300*r* corresponding to the reference usage region 220*r*. Note that the usage region 220*d* is overlapped with a part of the reference usage region 220*r*.

That is, it is determined that the position of the usage region 220 of the display screen 21 is positioned on the side in the Iy-axis negative direction as the user viewpoint position 100 detected by the viewpoint position acquiring unit 40 moves downward in the vertical direction. Further, it is determined that the length of the usage region 220 of the display screen 21 in the Iy-axis direction is reduced as the user viewpoint position 100 detected by the viewpoint position acquiring unit 40 moves downward in the vertical direction. As a result, the virtual image region 300 positions on the lower side in the vertical direction in the real space and a length thereof in the vertical direction in the real space is reduced as the user viewpoint position 100 detected by the viewpoint position acquiring unit 40 moves downward in the vertical direction.

Herein, when referring to FIG. 5, the superimposed distance range 400*r*, the superimposed distance range 400*u*, and the superimposed distance range 400*d* are matched. As in the example shown in FIG. 5, an amount of change in the virtual image region 300 in the vertical direction is smaller than an amount of change in the user viewpoint position 100 in the vertical direction. With this, for example, an angle between a line of sight in which the user sees the virtual image region 300 and a horizontal surface is increased as the user viewpoint position 100 moves upward in the vertical direction. On the contrary, for example, the angle between the line of sight in which the user sees the virtual image region 300 and the horizontal surface is reduced as the user viewpoint position 100 moves downward in the vertical direction.

As a result, in order to cause the superimposed distance range 400 to be constant without being influenced by the user viewpoint position 100 in the vertical direction, it is necessary not only to move a position of the virtual image region 300 in the vertical direction upward in the vertical direction but also to increase the length thereof in the vertical direction as the user viewpoint position 100 moves upward in the vertical direction. Similarly, in order to cause the superimposed distance range 400 to be constant without being influenced by the user viewpoint position 100 in the vertical direction, it is necessary not only to move the position of the virtual image region 400 in the vertical direction downward in the vertical direction but also to reduce the length thereof in the vertical direction as the user viewpoint position 100 moves downward in the vertical direction.

That is, when the position of the usage region 220 on the Iy-axis and the length thereof on the Iy-axis are appropriately determined in accordance with the user viewpoint position 100 in the vertical direction, it is possible to cause the superimposed distance range 400 to be constant without being influenced by the user viewpoint position 100 in the vertical direction. When the superimposed distance range 400 is constant, it is possible to deal with a shift of a target in the scenery on which the virtual image 310 visually recognized by the user is superimposed.

A relationship between the user viewpoint position 100 in the vehicle forward-backward direction and the usage region 220 corresponding to the user viewpoint position 100 in the vehicle forward-backward direction will be described. A user viewpoint position 100*f* shown in FIG. 4D is an example of the user viewpoint position 100 positioning in the vehicle forward direction, as compared to the reference user viewpoint position 100*r*. For example, when the user viewpoint position 100 acquired in Step S02 shown in FIG. 3 is the user viewpoint position 100*f*, in Step S04 shown in FIG. 3, the image generating unit 30 determines the usage region 220 within the display region 210 of the display screen 21 of the image display unit 20 as a usage region 220*f* in FIG. 4D.

Both a length 222*f* of the usage region 220*f* shown in FIG. 4D in the Ix-axis direction and a length 221*f* thereof in the Iy-axis direction are reduced, as compared to a length 222*r* of the reference usage region 220*r* in the Ix-axis direction and the length 221*r* thereof in the Iy-axis direction. As a result, both a length of the virtual image region 300 corresponding to the usage region 220*f* shown in FIG. 4D in the vehicle left-right direction and a length thereof in the vertical direction in the real space are short, as compared to the virtual image region 300 corresponding to the reference usage region 220*r*.

That is, it is determined that both the length of the usage region 220 of the display screen 21 in the Ix-axis direction and the length thereof in the Iy-axis direction are reduced as the user viewpoint position 100 detected by the viewpoint position acquiring unit 40 moves in the vehicle forward direction. As a result, both the length of the virtual image region 300 in the vehicle left-right direction and the length thereof in the vertical direction in the real space are reduced as the user viewpoint position 100 detected by the viewpoint position acquiring unit 40 moves in the vehicle forward direction.

A user viewpoint position 100b shown in FIG. 4E is an example of the user viewpoint position 100 positioning in a vehicle backward direction, as compared to the reference user viewpoint position 100r. For example, when the user viewpoint position 100 acquired in Step S02 shown in FIG. 3 is the user viewpoint position 100b, in Step S04 shown in FIG. 3, the image generating unit 30 determines the usage region 220 within the display region 210 of the display screen 21 of the image display unit 20 as a usage region 220b shown in FIG. 4E.

Both a length 222b of the usage region 220b shown in FIG. 4E in the Ix-axis direction and a length 221b thereof in the Iy-axis direction are increased, as compared to the length 222r of the reference usage region 220r in the Ix-axis direction and the length 221r thereof in the Iy-axis direction. As a result, both a length of the virtual image region 300 corresponding to the usage region 220b shown in FIG. 4E in the vehicle left-right direction and a length thereof in the vertical direction in the real space are long, as compared to the virtual image region 300 corresponding to the reference usage region 220r.

That is, it is determined that both the length of the usage region 220 of the display screen 21 in the Ix-axis direction and the length thereof in the Iy-axis direction are increased as the user viewpoint position 100 detected by the viewpoint position acquiring unit 40 moves in the vehicle backward direction. As a result, both the length of the virtual image region 300 in the vehicle left-right direction and the length thereof in the vertical direction in the real space are increased as the user viewpoint position 100 detected by the viewpoint position acquiring unit 40 moves in the vehicle backward direction.

For example, assuming that the virtual image region 300 is constant, a range of the scenery on which the inside of the virtual image region 300 is superimposed within the scenery seen from the user viewpoint position 100 through the front windshield 2 is wider as a distance between the user viewpoint position 100 and the virtual image region 300 (distance in vehicle forward-backward direction) is shorter. On the contrary, the range of the scenery on which the inside of the virtual image region 300 is superimposed within the scenery seen from the user viewpoint position 100 through the front windshield 2 is narrower as the distance between the user viewpoint position 100 and the virtual image region 300 (distance in vehicle forward-backward direction) is longer.

As a result, in order to cause the range of the scenery on which the inside of the virtual image region 300 is superimposed to be constant without being influenced by the user viewpoint position 100 in the vehicle forward-backward direction, it is necessary to reduce both the length of the virtual image region 300 in the vehicle left-right direction and the length thereof in the vertical direction as the user viewpoint position 100 moves in the vehicle forward direction. Similarly, in order to cause the range of the scenery on which the inside of the virtual image region 300 is superimposed to be constant without being influenced by the user viewpoint position 100 in the vehicle forward-backward direction, it is necessary to increase both the length of the virtual image region 300 in the vehicle left-right direction and the length thereof in the vertical direction as the user viewpoint position 100 moves in the vehicle backward direction.

That is, when the length of the usage region 220 on the Ix-axis and the length thereof on the Iy-axis are appropriately determined in accordance with the user viewpoint position 100 in the vehicle forward-backward direction, it is possible to cause the range of scenery to be superimposed to be constant without being influenced by the user viewpoint position 100 in the vehicle forward-backward direction. When the range of the scenery to be superimposed is constant, it is possible to deal with a shift of a target in the scenery on which the virtual image 310 visually recognized by the user is superimposed.

As described above, the image generating unit 30 of the vehicle display device 10 of the invention determines the usage region 220 to be used to display an image on the display screen 21 of the image display unit 20 in accordance with the user viewpoint position 100 acquired by the viewpoint position acquiring unit 40. As a result, it is possible not only to adjust the position of the virtual image region 300 that is a region corresponding to the usage region 220 and a region in which the user can visually recognize the virtual image 310 but also adjust a size of the virtual image region 300. Therefore, the vehicle display device 10 eliminates the shift of the target in the scenery on which the virtual image 310 is superimposed, the shift occurring when the user viewpoint position 100 is changed, as compared to, for example, a vehicle display device capable of adjusting only the position of the virtual image region 300 by changing an angle of projection of the concave mirror 55 of the projecting unit 50. Therefore, the vehicle display device 10 of the invention can provide appropriate information to the user without being influenced by the user viewpoint position 100.

Herein, the image generating unit 30 may determine the usage region 220 in accordance with only the user viewpoint position 100 in the vertical direction or may determine the usage region 220 in accordance with only the user viewpoint position 100 in the vehicle forward-backward direction. However, the shift of the target in the scenery on which the virtual image 310 is superimposed is influenced more greatly by a change in the user viewpoint position 100 in the vertical direction than by a change in the user viewpoint position 100 in the vehicle forward-backward direction. Therefore, it is preferable that the image generating unit 30 determine the usage region 220 in accordance with at least the user viewpoint position 100 in the vertical direction.

Further, Step S02 and Step S04 shown in FIG. 3 described above are not necessarily executed every time. For example, Step S02 and Step S04 may be executed only when the flow shown in FIG. 3 is executed for the first time since the power supply of the vehicle 1 is turned on. Thereafter, when the flow shown in FIG. 3 is executed for the second or subsequent time since the power supply of the vehicle 1 is turned on, the processing in Step S02 and Step S04 may be omitted. For example, until the user who drives the vehicle 1 is changed, there is a low possibility that the user viewpoint position 100 in, in particular, the vertical direction is greatly changed. Therefore, when the viewpoint position 100 of the user who drives the vehicle 1 is acquired once after the power supply of the vehicle 1 is turned on, both dealing with the shift of the target in the scenery on which the virtual image 310 is superimposed and an increase in speed of operation of the vehicle display device 10 can be achieved, for example.

The invention is not limited to the above-mentioned exemplary embodiment, and a person skilled in the art could easily modify the above-mentioned exemplary embodiment within a range encompassed in the scope of CLAIMS.

INDUSTRIAL APPLICABILITY

The invention is mounted on a vehicle such as a car and is applied to, for example, a head-up display device for causing a virtual image to be visually recognized.

REFERENCE SIGNS LIST

1 ... vehicle, 2 ... front windshield, 10 ... vehicle display device, 20 ... image display unit, liquid crystal panel module, 21 ... display screen, liquid crystal panel, 30 ... image generating unit, 40 ... viewpoint position acquiring unit, 41 ... vehicle interior image acquiring unit, 42 ... vehicle interior image analyzing unit, 50 ... projecting unit, 80 ... image light, 100 ... user viewpoint position, 210 ... display region, 220 ... usage region, 300 ... virtual image region, 310 ... virtual image, 400 ... superimposed distance range.

The invention claimed is:

1. A vehicle display device, comprising:
an image display unit including a display screen, the display screen comprising a usage region having a first size, the image display unit emitting light representing an image through the usage region of the display screen;
a projector configured to:
receive the light emitted through the usage region of the display screen; and
project the light onto a projection surface to allow a virtual image of the image to be superimposed over an area of a scenery outside the vehicle when viewed from a user in a vehicle;
a viewpoint position sensor configured to acquire a viewpoint position of the user in the vehicle;
a processor; and
a memory storing instructions, which when executed by the processor, cause the processor to:
generate the image to be represented by the light emitted from the usage region of the display screen;
receive, from the viewpoint position sensor, a first viewpoint position of the user; and
when a first change in the viewpoint position of the user from the first viewpoint position to a second viewpoint position along a forward-backward direction of the vehicle is received from the viewpoint position sensor, adjust a size of the usage region on the display screen from a first size to a second size so that an area of the scenery over which the virtual image of the generated image is superimposed when viewed from the second viewpoint position is maintained to be the same as an area of the scenery over which the virtual image of the generated image is superimposed when viewed from the first viewpoint position.

2. The vehicle display device according to claim 1, wherein
when the first change includes the second viewpoint position to be closer to a front side of the vehicle than the first viewpoint position along the forward-backward direction of the vehicle, the size of the usage region is adjusted so that the second size of the usage region is smaller than the first size of the usage region.

3. The vehicle display device according to claim 2, wherein
the first size of the usage region comprises a first length in a first direction of the display screen and a second length in a second direction perpendicular to the first direction of the display screen,
the second size of the usage region comprises a third length in the first direction and a fourth length in the second direction,
the third length of the second size is shorter than the first length of the first size, and
the fourth length of the second size is shorter than the second length of the first size.

4. The vehicle display device according to claim 1, wherein
when the first change includes the second viewpoint position to be closer to a rear side of the vehicle than the first viewpoint position along the forward-backward direction of the vehicle, the size of the usage region is adjusted so that the second size of the usage region is larger than the first size of the usage region.

5. The vehicle display device according to claim 4, wherein
the first size of the usage region comprises a first length in a first direction of the display screen and a second length in a second direction perpendicular to the first direction of the display screen,
the second size of the usage region comprises a third length in the first direction and a fourth length in the second direction,
the third length of the second size is longer than the first length of the first size, and
the fourth length of the second size is longer than the second length of the first size.

6. The vehicle display device according to claim 1, wherein
the usage region is disposed at a first position on the display screen,
when a second change in the viewpoint position of the user from the first viewpoint position to a third viewpoint position along a vertical direction of the vehicle is received from the viewpoint position sensor, 1) a position of the usage region is adjusted from the first position to a second position on the display so that an area of the scenery over which the virtual image of the generated image is superimposed when viewed from the third viewpoint position is maintained to be the same as the area of the scenery over which the virtual image of the generated image is superimposed when viewed from the first viewpoint position and 2) the size of the usage region is adjusted from the first size to a third size, and
the vertical direction is perpendicular to the forward-backward direction and a left-right direction of the vehicle.

7. The vehicle display device according to claim 6, wherein
the display screen comprises a first side, a second side opposite the first side, a third side extending between the first side and the second side, and a fourth side opposite the third side and extending between the first side and the second side,
a first direction of the display screen extends between the first side and the second side,
the first direction of the display screen corresponds to the vertical direction of the vehicle,
a second direction of the display screen extends between the third side and the fourth side,
the second direction is perpendicular to the first direction of the display screen,
the first size of the usage region comprises a first length in the first direction of the display screen and a second length in the second direction,
the third size of the usage region comprises a fifth length in the first direction and a sixth length in the second direction,
when the second change includes the third viewpoint position to be closer to an upper side of the vehicle than the first viewpoint position along the vertical direction of the vehicle, 1) the position of the usage region is adjusted so that the second position is disposed closer to the first side of the display screen than the first position on the display screen in the first direction of the display screen and 2) the size of usage region is adjusted from the first size to the third size so that the fifth length of the third size is longer than the first length of the first size, and when the second change includes the third viewpoint position to be closer to a bottom side of the vehicle than the first viewpoint position along the vertical direction of the vehicle, 1) the position of the usage region is adjusted so that the second position is disposed closer to the second side of the display screen than the first position on the display screen in the first direction of the display screen and 2) the size of usage region is adjusted from the first size to the third size so that the fifth length of the third size is shorter than the first length of the first size.

8. A vehicle display device, comprising:

an image display unit including a display screen, the display screen comprising a usage region having a first size, the first size of the usage region comprises a first length in a first direction of the display screen and a second length in a second direction perpendicular to the first direction of the display screen, the image display unit emitting light representing an image through the usage region of the display screen;

a projector configured to:
  receive the light emitted through the usage region of the display screen; and
  project the light onto a projection surface to allow a virtual image of the image to be superimposed over an area of a scenery outside the vehicle when viewed from a user in a vehicle;

a viewpoint position sensor configured to acquire a viewpoint position of the user in the vehicle;

a processor; and a memory storing instructions, which when executed by the processor, cause the processor to:
  generate the image to be represented by the light emitted from the display screen;
  receive, from the viewpoint position sensor, a first viewpoint position of the user; and
  when a first change in the viewpoint position of the user from the first viewpoint position to a second viewpoint position being closer to a front side of the vehicle than the first viewpoint position is received from the viewpoint position sensor, 1) adjust the first length of the usage region to a third length being shorter than the first length and 2) adjust the second length of the usage region to a fourth length being shorter than the second length,
  when a second change in the viewpoint position of the user from the first viewpoint position to a second viewpoint position being closer to a rear side of the vehicle than the first viewpoint position is received from the viewpoint position sensor, 1) adjust the first length of the usage region to a fifth length being longer than the first length and 2) adjust the second length of the usage region to a sixth length being longer than the second length, wherein the usage region is disposed at a first position on the display screen, when a third change in the viewpoint position of the user from the first viewpoint position to a third viewpoint position along a vertical direction of the vehicle is received from the viewpoint position acquiring unit, 1) a position of the usage region is adjusted from the first position to a second position on the display so that an area of the scenery over which the virtual image of the generated image is superimposed when viewed from the third viewpoint position is maintained to be the same as the area of the scenery over which the virtual image of the generated image is superimposed when viewed from the first viewpoint position and 2) the first length of the usage region is adjusted to a seventh length, the seventh length differs from the first length, the vertical direction is perpendicular to a forward-backward direction and a left-right direction of the vehicle, the display screen comprises a first side, a second side opposite the first side, a third side extending between the first side and the second side, and a fourth side opposite the third side and extending between the first side and the second side, the first direction of the display screen extends between the first side and the second side, the first direction of the display screen corresponds to the vertical direction of the vehicle, a second direction of the display screen extends between the third side and the fourth side, the second direction is perpendicular to the first direction of the display screen, when the third change includes the third viewpoint position to be closer to an upper side of the vehicle than the first viewpoint position along the vertical direction of the vehicle, 1) a position of the usage region is adjusted from the first position to a second position on the display screen so that the second position is disposed closer to the first side of the display screen than the first position on the display screen in the first direction of the display screen and 2) the first length is adjusted to an eighth length being longer than the first length, and when the third change includes the third viewpoint position to be closer to a bottom side of the vehicle than the first viewpoint position along the vertical direction of the vehicle, 1) the position of the usage region is adjusted so that the second position is disposed closer to the second side of the display screen than the first position on the display screen in the first direction of the display screen and 2) the first length is adjusted to a ninth length being shorter than the first length.

* * * * *